United States Patent [19]

Smaby

[11] Patent Number: 5,180,030
[45] Date of Patent: Jan. 19, 1993

[54] TREE OR VERTICAL SUPPORT STAND

[76] Inventor: Paul W. Smaby, 4643 Harriet Ave S., Minneapolis, Minn. 55409

[21] Appl. No.: 846,021

[22] Filed: Mar. 5, 1992

[51] Int. Cl.$^5$ .................................... A01M 31/00
[52] U.S. Cl. ...................... 182/187; 182/3; 182/7; 182/150
[58] Field of Search .................. 182/3-11, 182/187, 133-136, 190; 244/151 R

[56] References Cited

U.S. PATENT DOCUMENTS

| | | | |
|---|---|---|---|
| 2,254,179 | 8/1941 | Hoyt | 182/7 |
| 2,851,085 | 9/1958 | Woodward | 182/187 X |
| 3,448,826 | 6/1969 | Rosenblum | 182/3 |
| 4,273,216 | 6/1981 | Weissmann | 182/3 |
| 4,347,914 | 9/1982 | Gary | 182/7 X |
| 4,938,436 | 7/1990 | Bradley et al. | 244/151 R |

FOREIGN PATENT DOCUMENTS

| | | | |
|---|---|---|---|
| 578890 | 10/1924 | France | 244/151 R |
| 835494 | 12/1938 | France | 244/151 R |
| 1233761 | 5/1971 | United Kingdom | 182/3 |

Primary Examiner—Alvin C. Chin-Shue
Attorney, Agent, or Firm—James R. Cwayna

[57] ABSTRACT

A combination vest or upper torso section and attached seat combination to enable the user to position himself at any vertical location along a tree trunk or other vertical support which permits the user to be in an at rest, seated position or active, standing position. The seat section of the unit is shiftable with respect to the torso section for seated use or travel, walking use and similarly may be detached from the upper torso section such that the upper section may be utilized as a vest. The unit includes flexible support cords for support of the seat and to provide at least partial back support for the user when he is in a seated position. In order to position himself in the tree, tree steps are described but these climbing aids do not form a portion of the invention.

8 Claims, 2 Drawing Sheets

TREE OR VERTICAL SUPPORT STAND

RELATED APPLICATIONS

There are no applications in the United States Patent Office currently on file by the inventor hereof.

FEDERAL SPONSORSHIP

This invention has not been made under any Federally sponsored research and development arrangement nor under any other research and development program.

FIELD OF THE INVENTION

This invention relates generally to fields wherein the user wishes to position him or herself in a tree or other vertical support for viewing and more particularly to a unit which will allow the user to comfortably position him or herself in a vertical support in both a rest, seated position and an erect position and wherein the elements comprising the unit are easily transported on a person's back or are separable from each other to allow only use of an upper torso, vest section.

SUMMARY OF THE INVENTION

The present application provides a device consisting of two primary elements namely, a vest or upper torso section and a seat section. If a complete vest, it may be utilized singularly or the seat section may be positionably attached thereto through belts for shifting the same from a carrying position on the back of the user to a seating position wherein the user utilizes the seat for support in a seated position once he has positioned himself at a desired vertical location along a tree trunk or other vertical support. The vest provides upper torso coverage and includes at least one support strap for giving the user back support when he is in the seated position.

The seat section includes in one form of the invention a pair of flexible cord or web supports for supporting the outer sides of the seat when the user is in the seated position. These three elements, seat and supports are removeably connectable to the tree through the use of a tree step or other anchoring device. The user also will support himself, particularly when in erect position, through a pair of tree steps secured to the tree for foot support. The flexible web or cord supports allow the user to sit and also to rise to an erect position in which position he can also move substantially around the vertical support for viewing access.

In carrying or toting position the seat is hingedly swung to a position to be carried on the user's back.

BACKGROUND AND OBJECTS OF THE INVENTION

Most users, whether bow and arrow hunters or shot gun users, photographers or other persons wishing to gain an elevated view of an area are well aware of tree stands. Most of the presently available tree stands provide complex connecting mechanisms and normally do not allow the user the ease of mobility after he positions himself in a tree that is allowed by the invention disclosed herein.

The applicant has searched the presently available commercial art and has found no unit that provides the advantages of the device disclosed herein.

In a search of the prior patented art the applicant has found the following listed patents. Westimayer, et al, 4,928,793; Westbrock, 4,924,972; Kepley, 4,813,441; Turner, 4,759,425; Moffitt, 4,397,500; Hundley, 3,065,821; Hice, 4,337,844; Machnik, 4,315,655; Sink, 4,776,503; Foot, 2,549,679 and Dubroc, 4,886,143.

The patents to Turner, Machnik, Dubroc and Foot basically provide only slings and are directed only to patents which allow a hunter to sit against a tree during rest periods or allow the hunter to position himself through positively fastened connectors in a seated position in a tree. They provide no means for a hunter to shift his position to an erect position for shooting and they similarly provide units which require a specific and complex tree connection and after positioning the same, the hunter somehow elevates himself into the unit.

The Westbrock, Kepley and Hundley units provide only seating units which again must be separately secured to the tree with the hunter thereafter elevating himself into the seated position.

The Sink reference discloses a seat which again requires attachment to the tree and only serves as a seat.

The Hice reference includes a collapsible rigid frame unit having a tree attachment portion and again only a seated position sling.

None of these units include a vest seat combination which allows the user to easily transport the device and which allows placement of the unit to the tree after the user has located his desired elevated position hunting position.

It is therefore an object of the applicant's invention to provide a vest seat combination wherein the seating portion is transportable in a back carrying position and shiftable to a seating position.

It is a further object of the applicant's invention to provide a vest-seat tree stand device wherein the user is allowed to shift himself from a rest, seated position to an erect active position which also supports the user in both such positions.

It is still a further object of the applicant's invention to provide a vest-seat tree stand for use in combination with normally provided tree steps wherein the user is capable of finding his desired vertical viewing position along a vertical support and thereafter removeably securing himself in such position which also allows sitting and standing for viewing.

It is still a further object of the applicant's invention to provide a vest-seat, tree stand unit which will, when in position, allow the user to swing himself at least partially about the tree to gain proper viewing access over any area.

These and other objects and advantages of the applicant's invention will more fully appear from a consideration of the accompanying drawings and disclosure.

SHORT DESCRIPTION OF THE DRAWINGS

DESCRIPTION OF A PREFERRED EMBODIMENT

Figure 1:
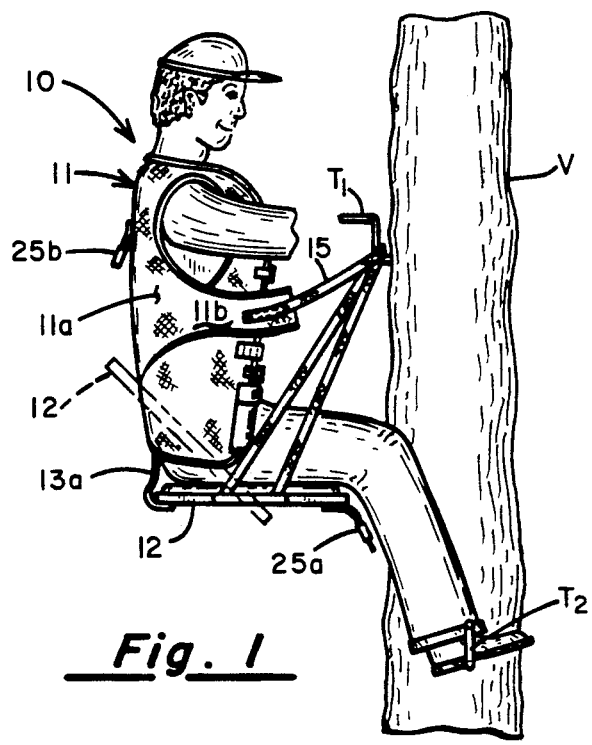
FIG. 1 is an illustration of a person wearing and utilizing the device of the invention and illustrating the seat section thereof in solid lines which allow the user to be seated along and against the tree and further illustrating the shifting of only the seating section in dotted lines to illustrate the shiftability of the seat to allow the user to rise from a seated to an erect position.
Figure 2:
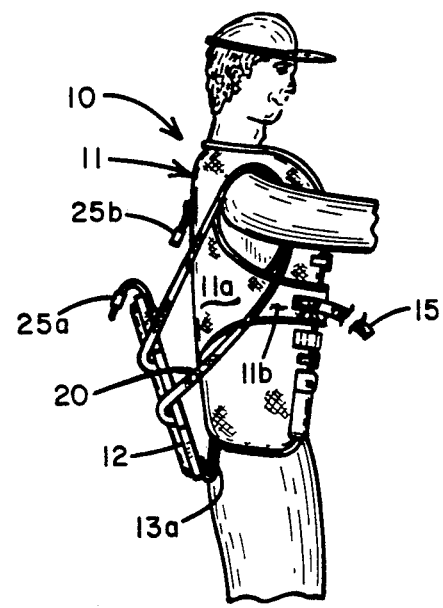
FIG. 2 is a side view of a person wearing the vest-seat combination as it would normally be carried as he or she ascends the tree.
Figure 3:
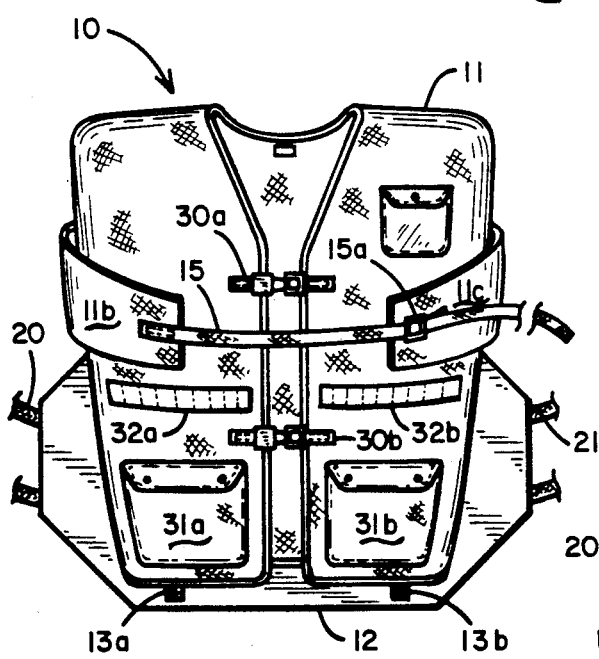
FIG. 3 is a front elevation illustrating the unit embodying the concepts of the applicant's invention with the seat section thereof in carrying position.
Figure 4:
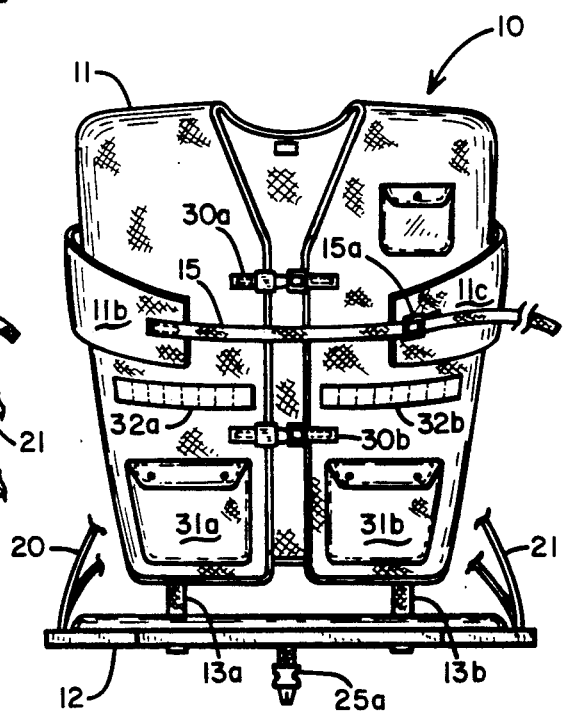
FIG. 4 is a view similar to FIG. 3 illustrating the unit with the seat section in seated use position.
Figure 5:
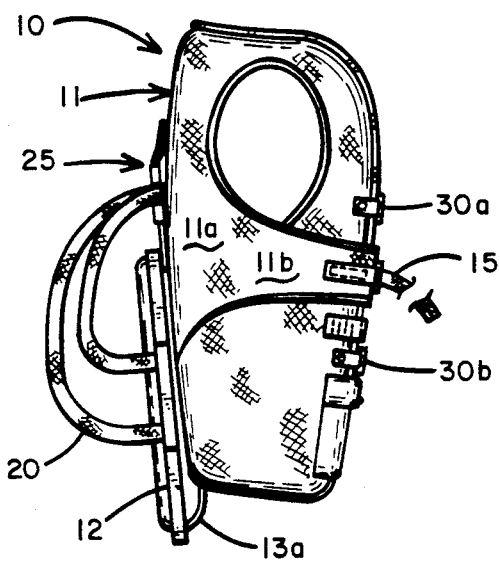
FIG. 5 is a side elevation corresponding to FIG. 3 wherein the seat section is in carrying position.
Figure 6:
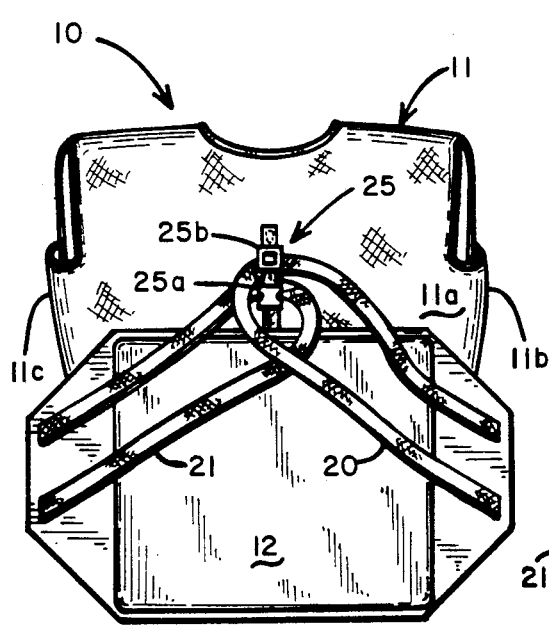
FIG. 6 is a rear view taken substantially from FIG. 5.
Figure 7:
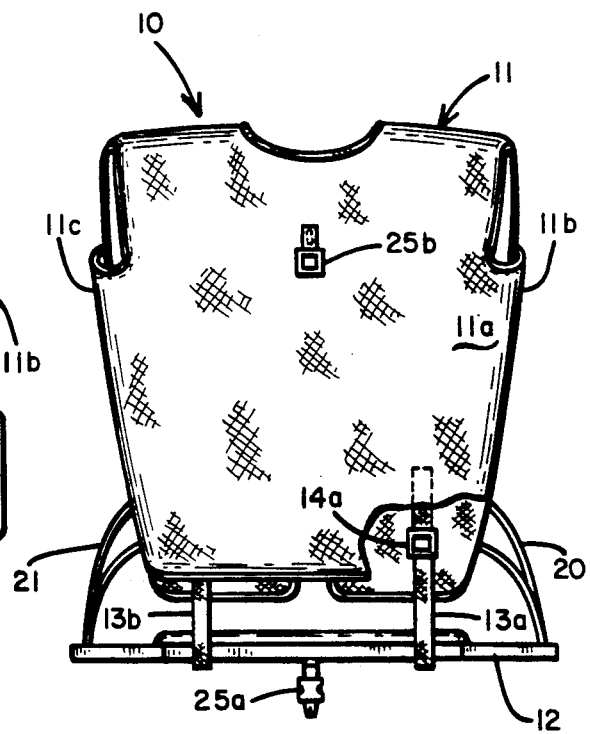
FIG. 7 is a rear view corresponding to that of FIG. 4 wherein the seat section is in the seating position.

In accordance with the accompanying drawings the applicant's vest-seat tree stand combination is generally designated 10 and includes a vest or upper torso covering or support section 11 and a seat section designated 12 which are flexibly connected to one another through a pair of spaced, connector elements such as straps or webs 13a, 13b with, in the form shown, adjustable buckle elements 14a, only one of which is illustrated. FIG. 1 illustrates a hunter utilizing the device on a vertical support such as a tree trunk V and the unit will be utilized with what are commonly known in the trade as tree steps T1, T2. Tree steps are formed, threaded devices for screwing into the tree to assist a hunter in climbing the tree if limbs are not present. As illustrated in FIG. 1 the hunter will normally rest his feet on two of the steps T2 and will use a third such unit T1 as described hereinafter.

As illustrated in FIG. 1 the arrangement allows the hunter to sit on the seat 12 adjacent the tree in a rest position and allows the hunter to stand upright for shooting and in such erect position the seat 12 will be shifted into the approximate dotted line position to provide at least a degree of support when the user is in such erect position.

As illustrated in the accompanying views the upper torso section 11 may be a full vest such that it may be separated from the seat 12 and utilized as a hunting vest but in any form it is provided with an upper back support portion 11a which extends at least partially forwardly of the vest to allow the user to lean back against the back of the vest in either seated or upright position. Obviously such support could be obtained through a single strap which would partially surround the user.

In the form shown this back support section 11a includes a pair of wrap around extensions 11b, 11c with an adjustable connector member 15 arranged to connect the ends thereof with again a slide type connector 15a to receive one end of such connector 15. As illustrated in the views, this connector 15 will, when the user is in seated position be looped over one of the tree steps T1. With this arrangement then it is obvious that the user can, when in this seated position, lean backwardly and be supported. In the erect position this connector 15 will normally not come into play.

The means for supporting the seat 12, in the form shown, include a line or web 20, 21 attached at the ends thereof to the seat 12 to form a loop on the respective ends of the seat. These respective loops 20, 21 are of such a length that they may be placed about the selected tree step T1 upon which the first mentioned connector 15 was placed. As illustrated in FIG. 1, as these cords or webs 20, 21 are flexible and are simply looped over the first tree step T1 they allow the seat to rise with the user when he shifts himself to vertical position. Although a loop arrangement is provided, it should be obvious that these elements 20, 21 provide seat 12 support and are connectable to the vertical stand V but may take many forms.

As illustrated, particularly in the rear views 6 and 7 of the drawings, when the seat 12 is in upright or transport position, a connector device generally designated 25 consisting of a male 25a and female 25b connection arrangement is provided such that the seat 12 is easily swung from what would be considered to be a horizontal seating position to a vertical carrying position where it is releasably locked against the vest 11. When the seat is being carried the supporting cords or webs 20, 21 are stored behind the connector device 25.

When the hunter wishes to climb a tree and position himself he will disconnect the seat connectors 25a, 25b and place the loops of supports 20, 21 over his shoulders to ready the seat for positioning. After the hunter, through the use of the tree steps T2, reaches his desired vertical location he will insert tree step T1 into the tree and loop the first connector 15 thereover such that he may now release the seat supporting elements 20, 21 from around his shoulders, swing the seat below himself and loop these seat supports 20, 21 about tree step T1.

As previously stated, when the user stands for example, to shoot, his weight will be primarily bore by tree steps T2 and the now shifted seat 12 will at least provide some support against him falling away from the tree even though connector 15 may slip from the tree step T1.

It should be obvious that the applicant has illustrated the tree steps T1 and T2 for use with his vest seat combination but that they form no portion of the invention. Branches of the tree may be available thus eliminating use of such steps.

It should be obvious that the important elements of the unit include the seat 12 and some form of back support 11 which will, with the support elements 15, 20 and 21, provide three point connection to the supporting or climbed vertical unit. In the form shown the applicant has illustrated a full vest and if such a full vest is provided closure elements such as connectors 30a, 30b would be a logical inclusion to complete a vest and pockets 31a, 31b and cartridge carrying sections 32a, 32b could be provided.

It should be obvious that the applicant has provided a new and unique combination of a back support and seat arrangement for use by any person wishing to utilize a tree as a vertical support. It should be obvious that the flexibility of the unit, particularly due to the connective cord structures 15, 20 and 21 allow the user to swing himself substantially around the tree to enlarge his field of sight and position himself for his desired activity and further that the unit provides ease of transport and complete climbing and positioning ease and further allows separable use of the elements should the user so desire to simply use the vest portion thereof.

What I claim is:

1. A tree stand for allowing the user to position him or herself in an elevated position in a tree or other vertically positioned support including:
   a. a vest unit for wear by the user and substantially encompassing the upper torso of the unit;
   b. a pair of vest extensions arranged on said vest and extending forwardly from said vest unit;
   c. a pair of strap members extending from the respective ends of each of said extensions and attachable to the vertical support;
   d. a seat section including flexible connection means to connect the same to the lower rear side of said vest portion and shiftable from a first position adjacent the back of said vest for transport thereof and shiftable therefrom to a second position below the user to allow the user to sit thereon; and, e. the ends of said seat portion being provided with flexible strap means for attaching the same to the vertical support.

2. The tree stand as set forth in claim 1 and second flexible support connecting means provided in association with said upper torso section for releasably connecting the same to the vertical support.

3. The tree stand as set forth in claim 1 and said upper torso section and said seat section including releasable connecting means whereby said seat portion may be releasably attached to said upper torso section when the same is in said first position.

4. The tree stand as set forth in claim 1 and adjustable link means provided between said upper torso section and said seat section providing the flexible connection therebetween.

5. The tree stand as set forth in claim 1 and said pair of strap members extending from the respective ends of said vest extensions providing adjustable connective means.

6. The tree stand as set forth in claim 1 and said flexible strap means between said vest and said seat being adjustable.

7. The tree stand as set forth in claim 1 and said flexible strap means on the ends of said seat being adjustable.

8. The tree stand as set forth in claim 1 and said seat being removable from said vest portion to allow singular use of the vest.

* * * * *